(12) United States Patent
Lee et al.

(10) Patent No.: US 10,048,431 B2
(45) Date of Patent: Aug. 14, 2018

(54) LIGHT GUIDE MEMBER, LIGHTING APPARATUS USING THE LIGHT GUIDE MEMBER, AND METHOD OF FABRICATING THE LIGHT GUIDE MEMBER

(71) Applicant: SAMSUNG ELECTRONICS CO., LTD., Gyeonggi-do (KR)

(72) Inventors: Hong-seok Lee, Seongnam-si (KR); Hoon Song, Seoul (KR); Jun-bo Yoon, Daejeon (KR); Joo-hyung Lee, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/174,807

(22) Filed: Jun. 6, 2016

(65) Prior Publication Data

US 2016/0282546 A1 Sep. 29, 2016

Related U.S. Application Data

(62) Division of application No. 12/236,022, filed on Sep. 23, 2008, now abandoned.

(30) Foreign Application Priority Data

Nov. 16, 2007 (KR) ........................ 10-2007-0117357

(51) Int. Cl.
   *F21V 8/00* (2006.01)
   *B29C 33/38* (2006.01)
   (Continued)

(52) U.S. Cl.
   CPC ........ *G02B 6/0065* (2013.01); *B29C 33/3842* (2013.01); *B29C 33/424* (2013.01);
   (Continued)

(58) Field of Classification Search
   CPC .. G02B 6/0028; G02B 6/0038; G02B 6/0036; G02B 6/0068; G02B 6/0061; G02B 6/0051; G02B 6/0053; B29C 33/38–33/405
   USPC ................................ 362/610, 615, 617, 618
   See application file for complete search history.

(56) References Cited

U.S. PATENT DOCUMENTS 5,350,376 A   9/1994   Brown
5,654,736 A   8/1997   Green et al.
(Continued)

FOREIGN PATENT DOCUMENTS

| JP | 11-109135 A | 4/1999 |
| KR | 2002-0005369 A | 1/2002 |
| KR | 10-2007-0028396 A | 3/2007 |

OTHER PUBLICATIONS

Communication dated Jul. 12, 2013 issued by the Korean Intellectual Property Office in counterpart Korean Patent Application No. 10-2007-0117357.

*Primary Examiner* — Jong-Suk (James) Lee
*Assistant Examiner* — Mark Tsidulko
(74) *Attorney, Agent, or Firm* — Sughrue Mion, PLLC

(57) ABSTRACT

Provided are a light guide member, a lighting apparatus including the light guide member, and a method of fabricating the light guide member. The light guide member comprises: a body, which is formed as a transparent plate, including a first surface and a second surface facing the first surface; and a plurality of dimple type optical controllers formed beneath at least one of the first surface and the second surface and having reflective surfaces that reflect light proceeding between the first and second surfaces of the body toward at least one of the first and second surfaces.

5 Claims, 10 Drawing Sheets

(51) Int. Cl.
- *B29C 33/42* (2006.01)
- *B29C 35/08* (2006.01)
- *B29C 37/00* (2006.01)
- *B29D 11/00* (2006.01)
- *B29K 83/00* (2006.01)

(52) U.S. Cl.
CPC ...... *B29C 35/0894* (2013.01); *B29C 37/0053* (2013.01); *B29D 11/00663* (2013.01); *G02B 6/0036* (2013.01); *G02B 6/0055* (2013.01); *B29C 2035/0827* (2013.01); *B29K 2083/00* (2013.01)

(56) References Cited

U.S. PATENT DOCUMENTS

| | | | |
|---|---|---|---|
| 5,921,651 A | 7/1999 | Ishikawa | |
| 6,167,169 A | 12/2000 | Brinkman et al. | |
| 6,704,070 B2 | 3/2004 | Taniguchi et al. | |
| 6,962,667 B2* | 11/2005 | Shimizu | B29C 31/04 264/1.1 |
| 6,979,112 B2 | 12/2005 | Yu et al. | |
| 7,160,017 B2* | 1/2007 | Lee | G02B 6/0038 362/606 |
| 7,201,497 B2* | 4/2007 | Weaver, Jr. | F21K 9/00 257/E25.02 |
| 7,322,733 B2 | 1/2008 | Chang et al. | |
| 7,462,794 B2 | 12/2008 | Lee et al. | |
| 7,543,972 B2 | 6/2009 | Huang et al. | |
| 8,523,420 B2* | 9/2013 | Baek | G02B 6/0011 362/616 |
| 8,860,908 B2* | 10/2014 | Ro | G02B 6/0016 349/65 |
| 8,974,060 B2* | 3/2015 | Plaian | A61B 3/12 351/206 |
| 2005/0270798 A1 | 12/2005 | Lee et al. | |
| 2009/0080216 A1 | 3/2009 | Tanabe | |

\* cited by examiner

LIGHT GUIDE MEMBER, LIGHTING APPARATUS USING THE LIGHT GUIDE MEMBER, AND METHOD OF FABRICATING THE LIGHT GUIDE MEMBER

CROSS-REFERENCE TO RELATED PATENT APPLICATIONS

This application is a Divisional Application of U.S. patent application Ser. No. 12/236,022 filed on Sep. 23, 2008, which claims foreign priority from Korean Patent Application No. 10-2007-0117357, filed on Nov. 16, 2007, the contents of which are incorporated herein by reference in their entireties.

BACKGROUND OF THE INVENTION

1. Field of the Invention

Apparatuses and methods consistent with the present invention relate to a light guide plate, a lighting apparatus using the light guide plate, and a method of fabricating the light guide plate, and more particularly, to a light guide plate used in a backlight or a front light that is used as a lighting apparatus for displays.

2. Description of the Related Art

In general, backlight apparatuses illuminate flat panel display apparatuses such as liquid crystal display (LCD) apparatuses, and can be classified into direct type backlight apparatuses and light guide type backlight apparatuses according to a location of a light source. In addition, the light guide type backlight apparatuses are classified into flat type backlights and wedge type backlights.

In direct type backlight apparatuses, a light source is located right under a light-exiting surface so as to perform a surface-emission, and thus, a plurality of light sources can be arranged to improve a brightness and a light emitting surface can be increased. However, power consumption is increased, and it is difficult to diffuse the light sufficiently when the display is thinned. Then, a shape of a lamp in the light source is projected through a display screen, and thus, the uniformity of the brightness is degraded.

A light guide type backlight apparatus has a structure, in which light is incident from an edge of the light guide plate and is discharged through a light-exiting surface of the light guide plate, which is perpendicular to the edge of the light guide plate. Since the light source is disposed on the edge or a side surface of the light guide plate, a lateral length of the light guide plate limits the number of light sources. In addition, although it is easy to make the light guide type backlight apparatus thin, a structure for evenly distributing the brightness throughout the light emitting surface is more complicated than that of the direct type backlight apparatus.

A flat type backlight apparatus is used in monitors or cases requiring a high brightness. Light sources can be fixed on side edges or four corners of the light guide plate. In addition, in order to improve the brightness using a plurality of light sources, a thickness of the light guide plate must be constant.

A wedge type backlight apparatus is used when it is difficult to use a plurality of light sources because the power consumption is restricted, for example, in laptop computers. The wedge type backlight apparatus can be formed to have a structure, in which a surface, to which the light is incident, has a large area and the other surface has a small area, so as to reduce the weight of the wedge type backlight apparatus.

Line sources or point sources can be used as the light sources used in the light guide plate type backlight apparatus. Cold cathode fluorescent lamps (CCFL), in which electrodes are formed on both end portions of a tube, can be used as the line sources, and light emitting diodes (LEDs) can be used as the point sources. CCFL can emit high-intensity white light, obtain the light having high brightness and high uniformity, and can be designed to each have a large area. However, CCFL are driven by radio frequency alternating current (AC) signals, and operate within a small temperature range. LEDs emit light having lower brightness and lower uniformity than that of CCFL, however, LEDs are driven by a direct current (DC) signal within a large temperature range and have a long lifespan. In addition, LEDs may be formed to be thin.

On the other hand, a front light apparatus is located on a front portion of a display, and can be applied to, for example, a flexible display, which is referred to as e-paper. In the front light apparatus applied to the flexible display, the light source is disposed on edges of the light guide plate, and the front light apparatus is installed on the front portion of the flexible display to provide the flexible display with illumination light. The light guide plate used in the front light apparatus must transmit the display light reflected from the flexible display while illuminating the light from the edges to the flexible display, which is located on the rear portion of the front light apparatus. Therefore, the light guide plate used in the front light apparatus must transmit the display light reflected from the display, as well as provide the display with the light from the light source efficiently.

SUMMARY OF THE INVENTION

The present invention provides a light guide plate that can be commonly applied to both a backlight apparatus and a front light apparatus, a lighting apparatus using the light guide plate, and a method of fabricating the light guide plate.

According to an aspect of the present invention, there is provided a light guide member including: a body, which is formed as a transparent plate, including a first surface and a second surface facing the first surface; and a plurality of dimple type optical controllers formed beneath at least one of the first surface and the second surface and having reflective surfaces that reflect light proceeding between the first and second surfaces of the body toward at least one of the first and second surfaces.

According to another aspect of the present invention, there is provided a lighting apparatus including: a body, which is formed as a transparent plate, having a first surface and a second surface facing the first surface; a plurality of dimple type optical controllers formed beneath at least one of the first surface and the second surface and having reflective surfaces that reflect light proceeding between the first and second surfaces of the body toward at least one of the first and second surfaces; and light sources disposed on an edge of the body for irradiating the light between the first surface and the second surface.

The lighting apparatus may further include: a reflective surface disposed on the other edge of the body to face the light source.

The dimple type optical controllers are commonly formed on the first and second surfaces of the body, and the optical controllers on each of the surfaces reflect the light toward the opposite surface.

The reflective surface of the optical controller is formed to be commonly inclined with respect to the first and second surfaces of the body to reflect the light proceeding in the body toward the surface facing the surface, on which the corresponding optical controller is formed.

The optical controller includes at least two reflective surfaces facing each other, and there is a cavity, having an opening that is narrower than the bottom surface thereof, between the reflective surfaces facing each other.

The reflective surface can be plane or curved, and the cavity can include the bottom surface that is in parallel with the first and second surfaces of the body or curved as a spherical or an aspherical shape.

The size of the optical controller may increase as the optical controller is apart from the light source. In addition, the optical controller may have an asymmetric structure, that is, a length of the direction where the light is incident is shorter than the direction perpendicular to the light incident direction, and the length in the direction perpendicular to the light incident direction may be increased.

The optical controllers can be arranged as islands or stripes on the body, and the density of the optical controllers can increase linearly or non-linearly as the optical controllers are apart from the light source.

Each of the optical controllers formed as stripes is disposed to extend in a direction facing the light source.

The optical controllers of stripe shapes and the optical controllers of the island shapes are mixed on the body.

According to another aspect of the present invention, there is provided a method of fabricating a light guide member, the method including: forming a plurality of protrusion molds on a template having a flat surface, each of the protrusion molds including a top surface that is wider than a bottom and a side surface under the top surface and inclined toward the top surface; forming a transparent half-processed light guide member having a cross-section corresponding to the protrusion molds by applying a transparent material on the template on which the protrusion molds are formed; and separating the half-processed light guide member from the template and the protrusion molds so as to form the light guide member, which includes a first surface, a second surface facing the first surface, and a plurality of dimple type optical controllers, corresponding to the protrusion molds, in the first surface, wherein each of the optical controllers includes a reflective surface corresponding to the inclined side surface of each of the protrusion molds.

The forming of the protrusion molds may include: forming a light blocking mask, having openings corresponding to the protrusion molds, on the template; forming a photosensitive layer for forming the protrusion molds on the template to cover the light blocking mask; irradiating light to the light blocking mask to form exposure regions corresponding to the shapes of the protrusion molds in the photosensitive layer; and developing the photosensitive layer to obtain the protrusion molds from the exposure regions.

The light guide member may be formed of an elastic material, in particular, the elastic material may be polydimethylsiloxane.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Figure 1:
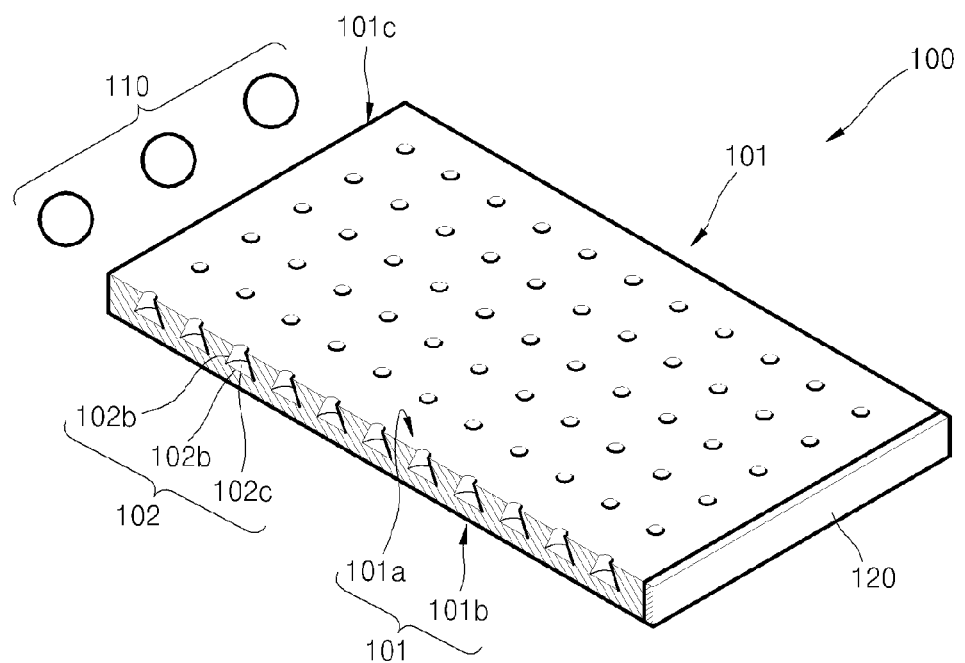
FIG. 1 is a schematic perspective view of a lighting apparatus having a light guide member, according to an embodiment of the present invention.

The invention is described more fully hereinafter with reference to the accompanying drawings, in which exemplary embodiments of the invention are shown. This should not be construed as limiting the claims to the exemplary embodiments shown. Rather, these embodiments are provided to convey the scope of the invention to those skilled in the art. In the drawings, the size and relative sizes of elements and regions may be exaggerated for clarity.

It will be understood that when an element or layer is referred to as being "on", "disposed on", "disposed", or "between" another element or layer, it can be directly on, disposed on, disposed, or between the other element or layer, or intervening elements or layers can be present.

The terms "first," "second," and the like, "primary," "secondary," and the like, as used herein do not denote any order, quantity, or importance, but rather are used to distinguish one element, region, component, layer, or section from another. The terms "front", "back", "bottom", and/or "top" are used herein, unless otherwise noted, merely for convenience of description, and are not limited to any one position or spatial orientation.

The terms "a" and "an" do not denote a limitation of quantity, but rather denote the presence of at least one of the referenced item. The suffix "(s)" as used herein is intended to include both the singular and the plural of the term that it modifies, thereby comprising one or more of that term (e.g., the layer(s) includes one or more layers).

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various exemplary embodiments.

Unless defined otherwise, technical and scientific terms used herein have the same meaning as is commonly understood by one of skill in the art to which this invention belongs. FIG. 1 is a partially cut perspective view showing a schematic structure of a lighting apparatus 100 including an integral type light guide member, according to an embodiment of the present invention.

Referring to FIG. 1, the lighting apparatus 100 according to the present embodiment includes a transparent plate-shaped body 101 having a first surface 101a and a second surface 101b facing the first surface 101a. Light sources 110 are disposed close to a side of the body 101, and a reflective layer 120 is selectively disposed on the opposite side of the body 101. The light sources 110 are each an apparatus for injecting light into the body 101, and the reflective layer 120 reflects the light incident to the side of the body 101 into the body 101 to improve a light-use efficiency.

Figure 2:
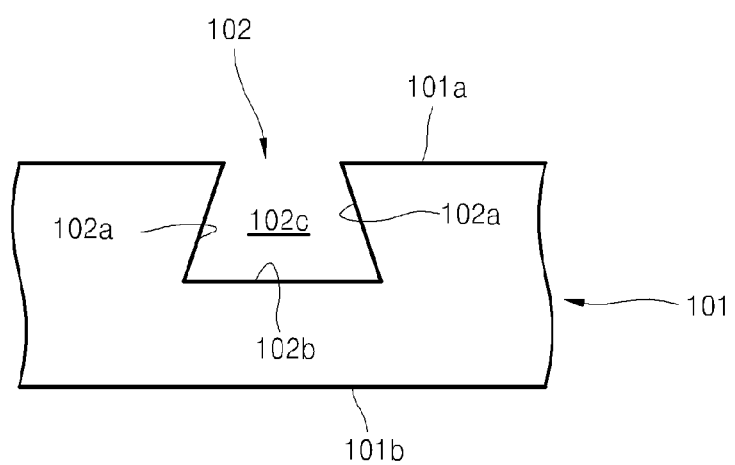
FIG. 2 is a cross-sectional view of an optical controller in the light guide member, according to the embodiment of the present invention.

On the other hand, dimple type optical controllers 102 are formed in the first surface 101a of the body 101. The optical controllers 102 are each a cavity 102c formed as a well extending downward from the first surface 101a, and are distributed completely throughout the body 101. The optical controllers 102 may be evenly distributed, or locally distributed. As shown in FIG. 2, the dimple type optical controllers 102, that is, the optical controllers 102 each having a recessed shape, each include the cavity 102c formed as a depression in the first surface 101a of the body 101, and reflective surfaces 102a and 102b that respectively form a side surface and a bottom of the cavity 102c and reflect the light inside the body 101. The reflective surfaces 102a and 102b reflect the light that is in the body 101 according to a difference between the refractive indexes of a medium of the body 101 and a medium of the cavity 102c, and in particular, reflect the light proceeding between the first surface 101a and the second surface 101b toward at least one of the first and second surfaces 101a and 101b. The reflective surface 102a, forming the side surface of the cavity 102c, is inclined with respect to the bottom surface of the cavity 102c, and accordingly, the cavity 102c has a narrow opening and the reflective surface 102b is wider than the opening.

According to the present embodiment of the present invention, the body 101 is formed of polydimethylsiloxane (PDMS) to a thickness of 400 to 600 µm. The opening and bottom of the cavity 102c have diameters of 12 to 13 µm and 25 to 35 µm, respectively. In addition, a depth of the cavity 102c is 10 to 15 µm, and a pitch between the cavities 102c is about 50 to 70 µm.

The reflective surface 102b can be disposed in parallel with the first and second surfaces 101a and 101b. In addition, the reflective surfaces 102a and 102b can be flat or curved, or mixed. On the other hand, when the cavity 102c has a curved side surface, for example, when the cavity 102c has a truncated conical side surface, the side surface of the cavity 102c is continuously formed. In addition, the side surface of the cavity 102c can be formed as a three-dimensional curved surface; for example, the cavity 102c can be formed as a barrel having a bulged intermediate portion.

Figure 3A:
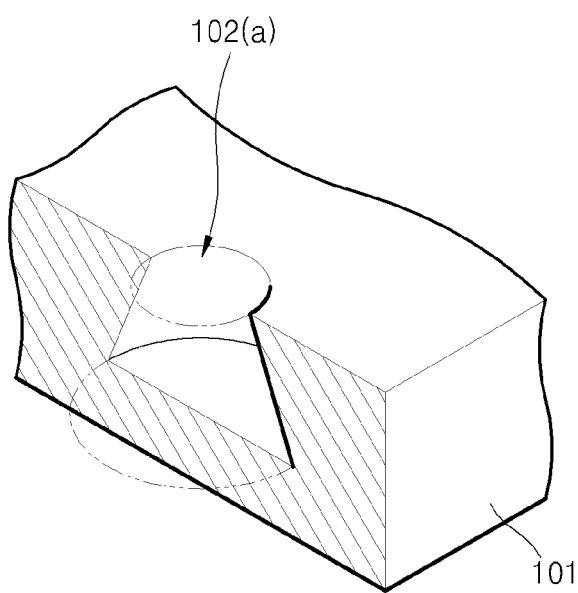
FIGS. 3A through 3E are perspective views showing structures of optical controllers according to embodiments of the present invention.
Figure 3B:
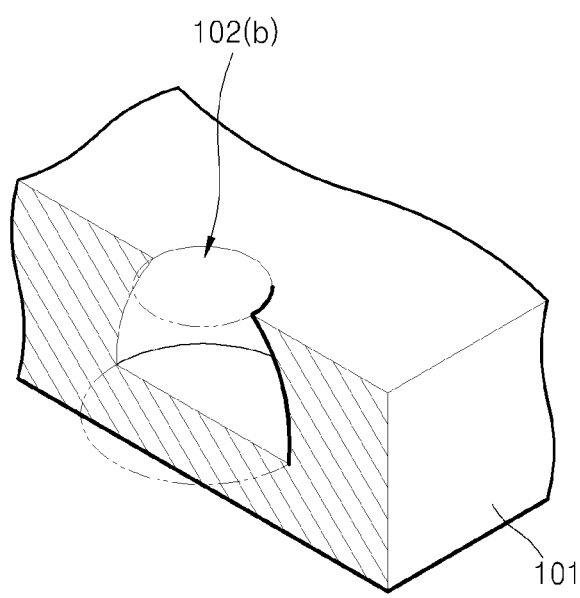
Figure 3C:
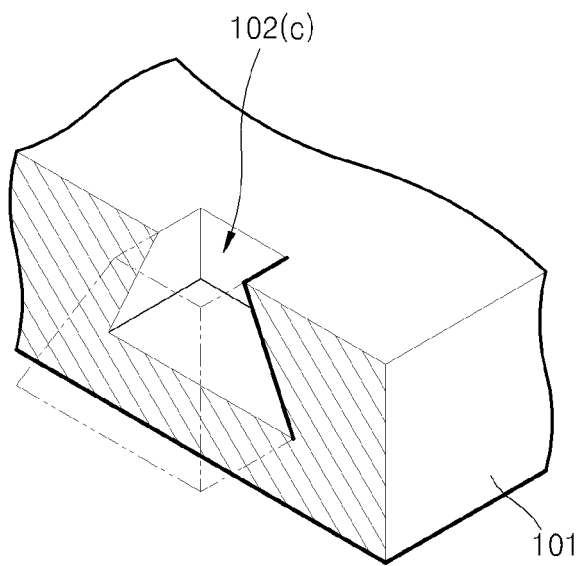
Figure 3D:
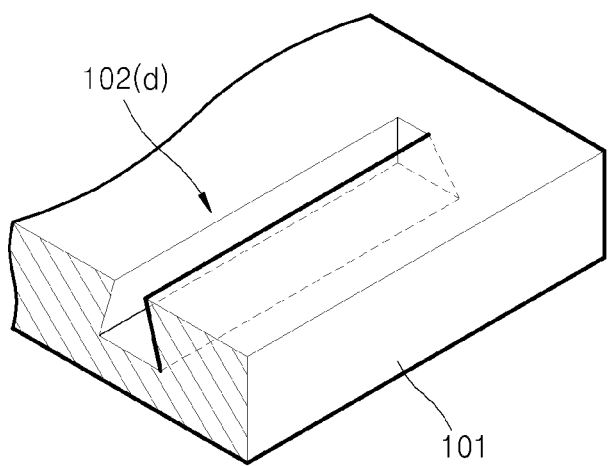
Figure 3E:
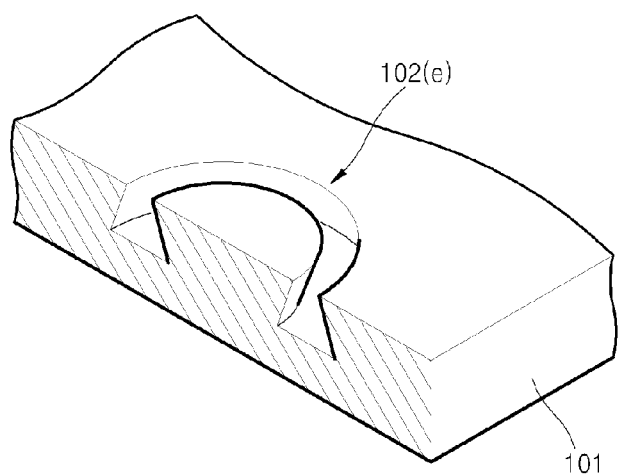

FIGS. 3A through 3E show various examples of optical controllers according to embodiments of the present invention. FIG. 3A shows an optical controller 102(a) having a truncated conical cavity. FIG. 3B shows an optical controller 102(b) having a barrel type cavity that includes a narrow opening and a wide bottom surface. FIG. 3C shows an optical controller 102(c) having a cavity formed as a truncated quadrangular pyramid. Although FIG. 3C shows the quadrangular pyramid type cavity, the optical controller 102(c) may have a truncated pyramid type cavity for which an example is the truncated quadrangular pyramid type cavity. FIG. 3D shows an optical controller 102(d) having a slot type cavity that is linearly elongated. That is, the optical controller 102(d) has a structure such that a length of the light incident direction along which the light is incident is shorter than the direction perpendicular to the light incident direction. FIG. 3E shows an optical controller 102(e) having a slot type cavity that is curved. As described above, various types of optical controllers can be obtained. In addition, the technical scope of the present invention is not limited by the shape of the optical controller.

Figure 4:
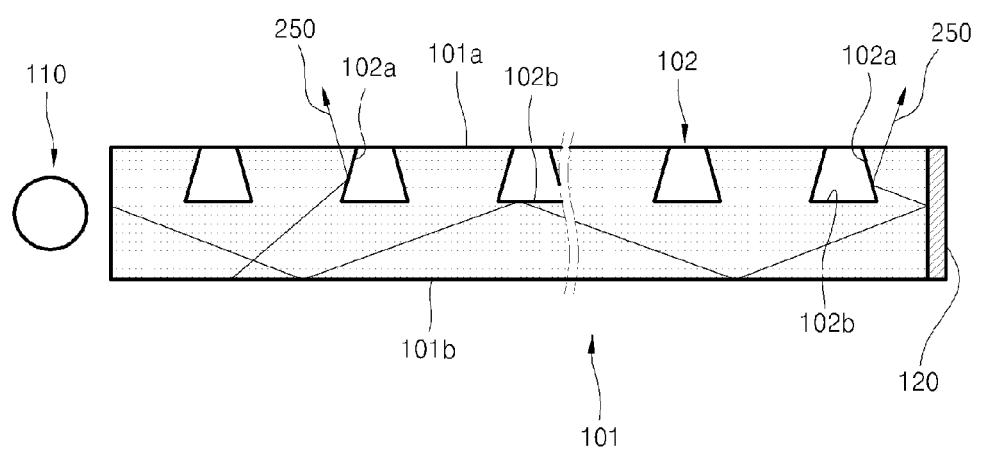
FIG. 4 is a schematic cross-sectional view of the lighting apparatus 100 to illustrate a light proceeding structure of the optical controllers that each have reflective surfaces.

FIG. 4 is a schematic cross-sectional view of the lighting apparatus 100 to illustrate a light guide structure of the optical controllers 102 each having the reflective surfaces 102a and 102b.

Referring to FIG. 4, the light emitted from the light source 110 such as an LED is incident (or introduced) to the body 101, proceeds in the body 101, and then, is totally reflected by the reflective surfaces 102a and 102b of the optical controllers 102 to exit the plate-shaped body 101 in a direction 250. Here, the light that is not discharged out of the body 101 is reflected by the reflective layer 120 that is located on an opposite side of the light source 110 toward the inside of the body 101, and then, the light reflected by the optical controller 102 is discharged out of the plate-shaped body 101 through the first surface 101a. Through the above internal reflecting structure, some of the light may be discharged through the second surface 101b. A light emission direction of the light injected into the body 101 may vary depending on the requirements of the lighting apparatus 100, for example, when an additional reflective layer (not shown) is formed on the second surface 101b of the plate-shaped body 101, in a backlight apparatus, the light is only emitted through the first surface 101a. However, in a front light apparatus, display light from the display must transmit through the front light apparatus, and the light emitted from the light source 110 is output to the display, for example, through the first surface 101a, and the light incident to the first surface 101a from the display must be output through the second surface 101b. The optical controllers 102 can be arranged according to the required design of the light apparatus.

A plurality of optical controllers 102 can be arranged in the light guide member 101, and in the present embodiment, the further the optical controllers 102 are located away from the light source 110, the concentration of the optical controllers 102 becomes higher. To do this, the distances or pitches between the optical controllers 102 can be linearly or non-linearly reduced as the optical controllers 102 are disposed further away from the light source 110. In addition, when the optical controllers 102 are distributed to be set apart from each other, the sizes of the optical controllers 102 can be differentiated so as to change the sizes of the reflective surfaces 102a and 102b, for example, so as to increase the area of the reflective surfaces 102a and 102b as the optical controllers 101 are further away from the light source 110.

Figure 5:
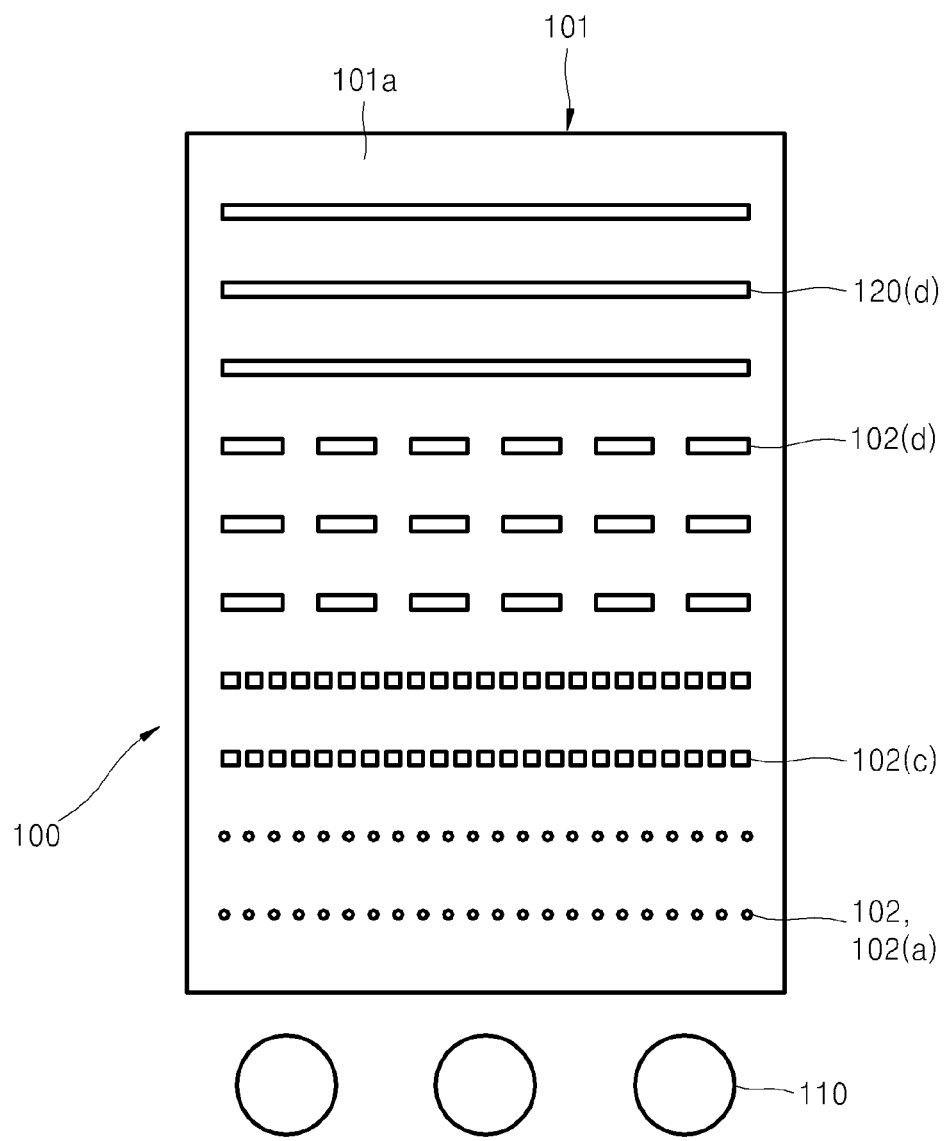
FIG. 5 is a plan view showing changes in the sizes of light controllers and arrangements of the light controllers in the light guide member according to another embodiment of the present invention.

FIG. 5 is a plan view of a lighting apparatus 100 having the body 101, on which the sizes and concentration of the optical controllers 102 having various shapes are different according to the distance of the optical controllers 102 from the light sources 110.

The various types of optical controllers 102(a), 102(c), 102(d), and 102(e) are arranged in the first surface 101a of the body 101 in the light apparatus 100. The optical controllers 102(a), 102(c), 102(d), and 102(e) are arranged along lines that are arranged with constant intervals from the light sources 110, and the concentration of the optical controllers in each of the lines increases as the lines are further apart from the light sources 110. The density of each line can be adjusted by changing the sizes and lengths of the optical controllers 102(a), 102(c), 102(d), and 102(e).

The LED as a point source, or the CCFL as a line source can be used as the light sources 110, and the shapes or arrangement of the optical controllers 102(a), 102(c), 102(d), and 102(e) may be adjusted according to the type of the light sources 110. The point source is appropriate for a front light apparatus, in which the light emission angle is not an important factor, and CCFL is appropriate for the line source.

Figure 6:
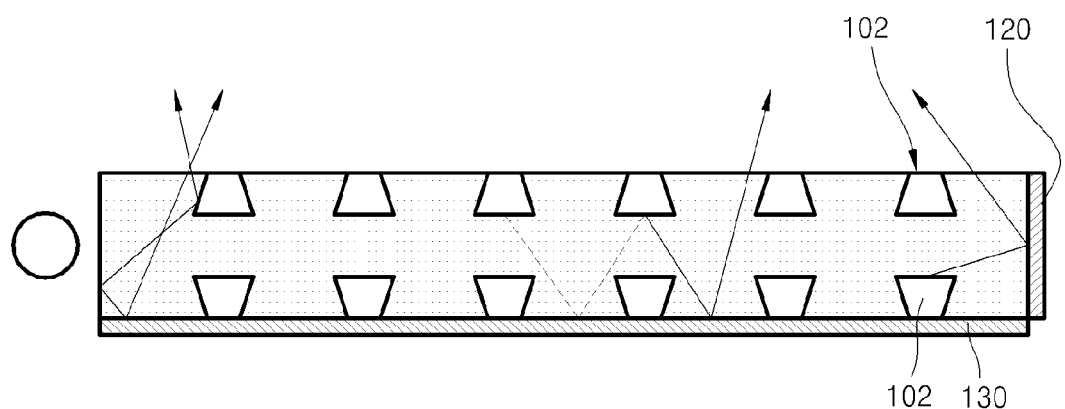
FIG. 6 is a cross-sectional view of a lighting apparatus according to another embodiment of the present invention.

The optical controllers 102 according to the embodiments of the present invention can be commonly formed in both the first and second surfaces 101a and 101b of the body 101 as shown in FIG. 6. At this time, a reflective plate 130 may be formed on the second surface 101b so that the light proceeding toward the second surface 101b can be reflected to the first surface 101a, and thereby increasing the light-use efficiency. Therefore, the structure shown in FIG. 6 can be used as a backlight apparatus in an LCD. In FIG. 6, optical controllers 102 are symmetrically formed in the first and second surfaces 101a and 101b, however, the optical controllers 102 may be asymmetrically disposed in the first and second surfaces 101a and 101b, and the distribution concentration and the shapes of the optical controllers 102 in each of the first and second surfaces 101a and 101b may be changed according to the optical characteristics of the lighting apparatus 100.

The light guide member and the lighting apparatus according to the present invention may not use an additional optical film as used in conventional backlight systems for LCD devices. That is, the light guide member having engraved optical controllers, that is, the dimple type optical controllers, formed using a simple lithography process is used, and thus, a lighting apparatus that is thin and light-weight can be formed with low fabrication costs. The light guide member and the lighting apparatus according to the present invention can be used as a backlight system in an LCD device, and can be used as a backlight of flexible LCD devices or a front light system in next generation flexible displays such as e-paper. In particular, when the lighting apparatus including the light guide member according to the present invention is applied as a front light apparatus, there is no air layer between the display and the light guide member, and thus, the reflection of external light can be reduced so as to improve visibility and a contrast ratio.

Hereinafter, a method of fabricating the light guide member according to an embodiment of the present invention will be described. In the current embodiment, the light guide member having the optical controllers 102 shown in FIG. 1 is fabricated, however, a light guide member having the other types of optical controllers 102(a), 102(c), 102(d), and 102(e) also can be fabricated.

Figure 7A:
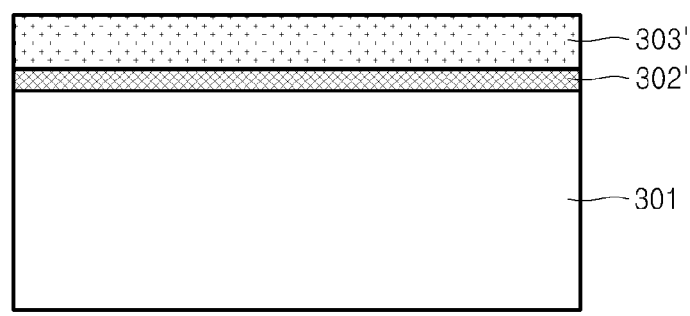
FIGS. 7A through 7J are cross-sectional views illustrating a method of fabricating the light guide member, according to an embodiment of the present invention.

Referring to FIG. 7A, a light blocking material, for example, a metal layer 302', is formed on a template 301, which is formed of a transparent material, and then, a photosensitive layer 303' is coated on the metal layer 302'.

Figure 7B:
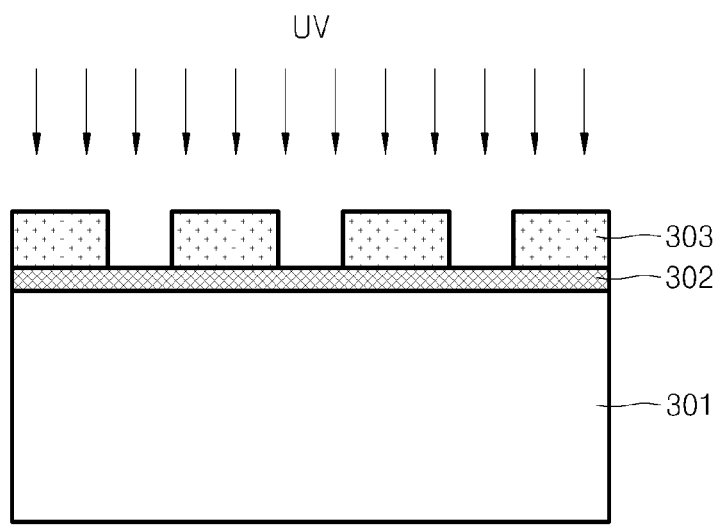

Referring to FIG. 7B, the photosensitive layer 303' is patterned to form a mask layer 303. The photosensitive layer 303' is patterned using a photolithography process, and in the present embodiment, the photosensitive layer 303' is patterned using a positive photoresist and developed using a wet developer. Portions that are not covered by the mask layer 303 correspond to the openings of the cavities 102c.

Figure 7C:
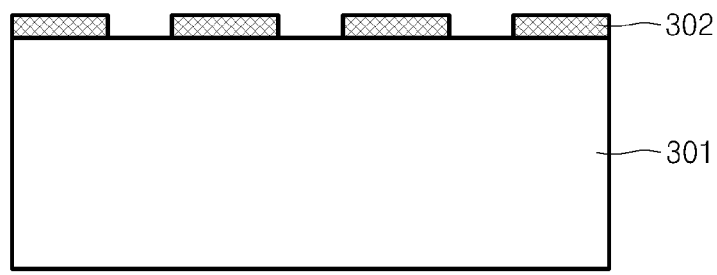

Referring to FIG. 7C, the metal layer 302' is patterned by a general wet or dry etching process using the mask layer 303 so as to form a light blocking mask layer 302 that is formed of a metal.

Figure 7D:
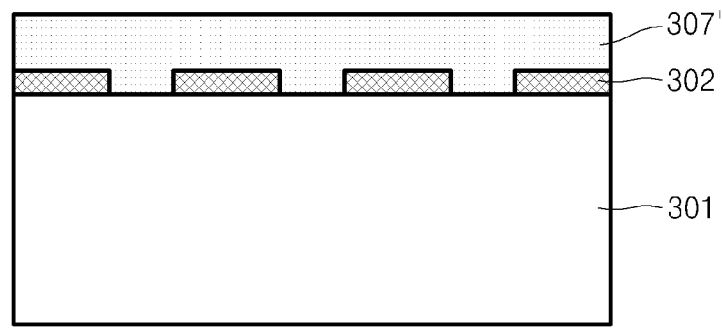

Referring to FIG. 7D, a photosensitive layer 307', covering the light blocking mask layer 302, is formed on the template 301. In the present embodiment, the photosensitive layer 307' is formed using a negative photoresist.

Figure 7E:
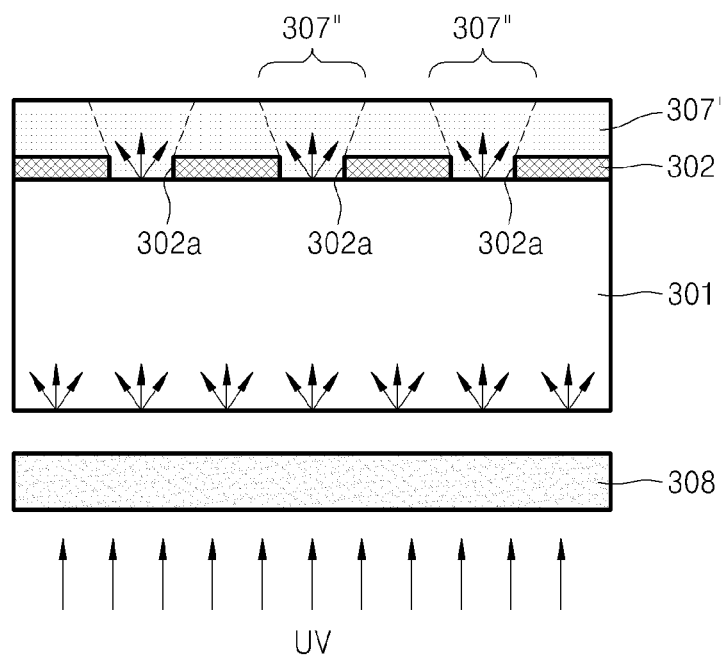
Figure 7F:
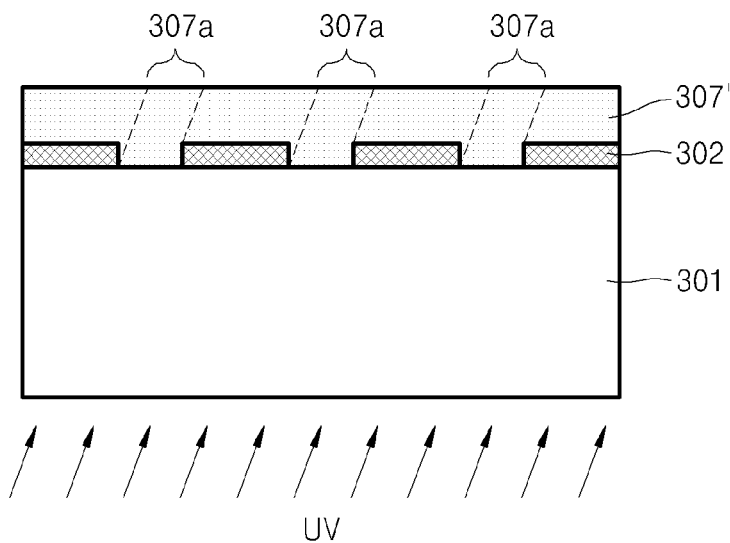
Figure 7G:
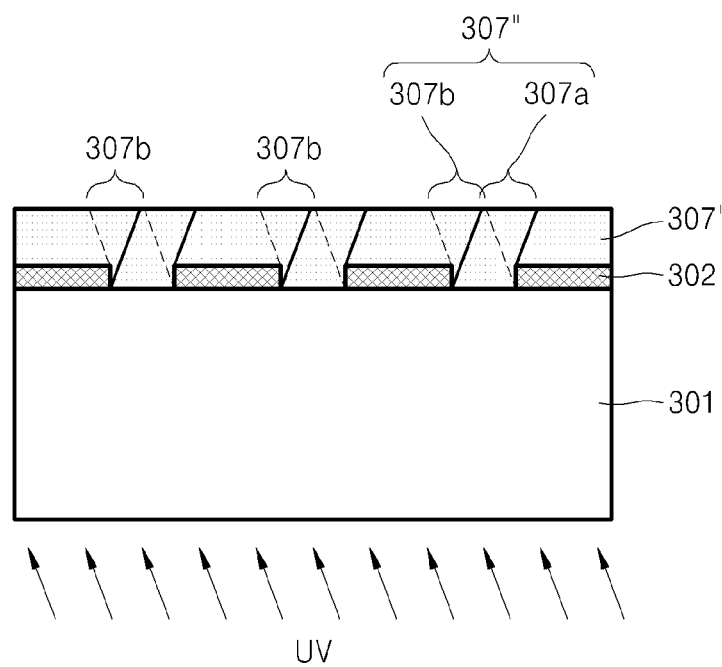

Referring to FIG. 7E, light is irradiated to a bottom surface of the template 301 to form photosensitive regions 307", each of which is formed as an inverse prism shape, at the openings 302a of the mask layer 302. To do this, diffused light is supplied from the bottom surface of the template 301. The diffused light can be obtained by forming a diffusion unit 308 between the light source and the template 301. On the other hand, when parallel light is used instead of the diffused light, as shown in FIG. 7F, the parallel light is incident to the template 301 in a first direction, which is inclined with respect to the template 301, to form first exposure regions 307a. Then, as shown in FIG. 7G, the parallel light is incident to the template 301 in a second direction, which is opposite to the first direction, to form second exposure regions 307b. Therefore, the photosensitive regions 307" can be obtained.

Figure 7H:
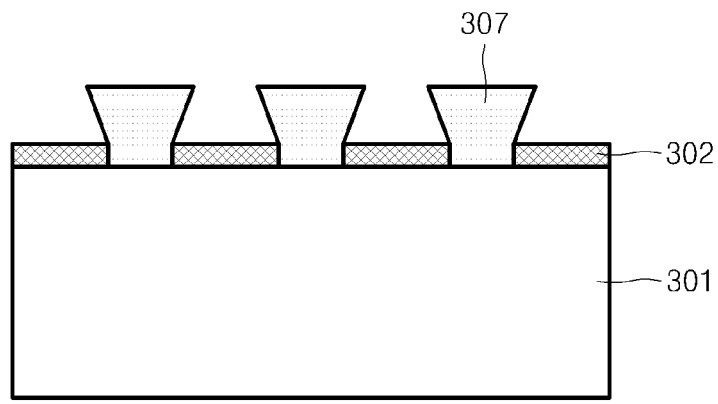

Referring to FIG. 7H, the photosensitive layer 307' having the photosensitive regions 307" is wet-etched to form protrusion molds 307. The protrusion molds 307 are obtained from the photosensitive regions 307" and are formed to correspond to the cavities 102c of the light guide member 100.

Figure 7I:
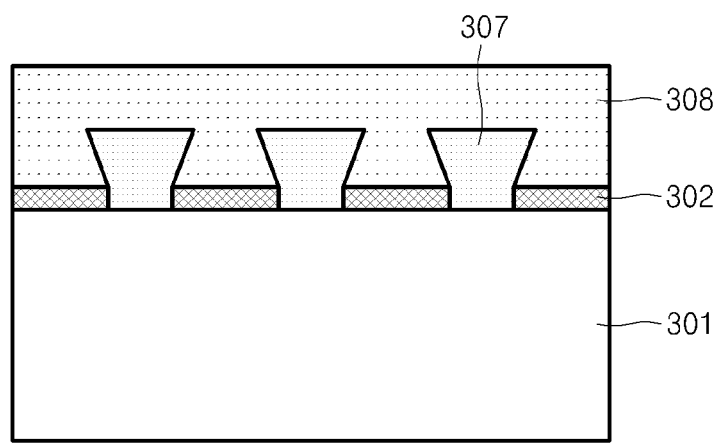
Figure 7J:
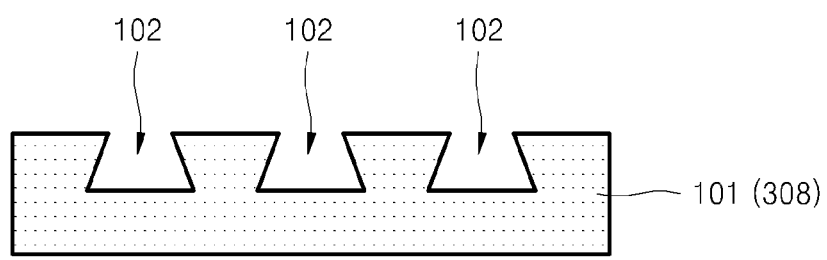

Referring to FIG. 7I, a material for forming the light guide member 101 is deposited on the template 301 to cover the protrusion molds 307 so as to form a half-processed light guide member 308. According to an embodiment of the present invention, the material for forming the light guide member is an elastic material, for example, PDMS. After the PDMS is completely cured, the half-processed light guide member 308 is separated from the protrusion molds 307 and the template 301, and post-processes are performed, then, the light guide member 101 having the dimple type optical controllers 102 can be obtained.

In the above description, the protrusion molds 307 are formed of a photosensitive material, however, the present embodiment of the present invention is not limited thereto, and thus, the protrusion molds 307 can be formed of a metal. That is, when the light guide member 101 is fabricated using a metal master, the molds formed of the photosensitive material are duplicated, and after that, inverse shapes of the molds are fabricated using a plating process. Otherwise, inverse molds are fabricated using a positive photosensitive layer, and after that, the metal molds can be fabricated by plating the molds. As described above, since the light guide member 101 is formed of the elastic material, the duplication can be performed even when the metal molds are used. Therefore, the molds are not transformed in the duplication, and the template can be re-used.

A light guide member and a lighting apparatus according to the present invention can be used as backlight systems of LCDs, and as front light systems of reflective LCDs or flexible displays such as e-paper.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:
1. A method of fabricating a light guide member, the method comprising:
forming a plurality of protrusion molds on a template having a first surface and a second surface opposite to the first surface, each of the plurality of protrusion molds being disposed on the first surface and including a top surface that is wider than a bottom surface and a side surface under the top surface and inclined toward the top surface;

forming a transparent half-processed light guide member having a cross-section corresponding to the plurality of protrusion molds by applying a transparent material on the template on which the plurality of protrusion molds are formed; and removing the template and the plurality of protrusion molds from the transparent half-processed light guide member so as to form the light guide member, which includes a first surface, a second surface facing the first surface, and a plurality of dimple type optical controllers, corresponding to the protrusion molds, in the first surface, wherein each of the plurality of dimple type optical controllers includes a reflective surface corresponding to the inclined side surface of each of the plurality of protrusion molds, wherein the forming of the plurality of protrusion molds comprises:

forming a light blocking mask, having openings corresponding to the plurality of protrusion molds, on the first surface of the template, the template being formed of transparent material;

forming a photosensitive layer for forming the plurality of protrusion molds on the first surface of the template to cover the light blocking mask;

irradiating light to the photosensitive layer through the openings of the light blocking mask to form exposure regions corresponding to the shapes of the plurality of protrusion molds in the photosensitive layer, the light being incident to the second surface of the template; and developing the photosensitive layer to obtain the plurality of protrusion molds from the exposure regions.

2. The method of claim 1, wherein the light is incident to the second surface of the template as diffused light via a diffusion unit.

3. The method of claim 1, wherein the light is incident to the second surface of the template as parallel light in a first direction inclined with respect to the second surface of the template.

4. The method of claim 1, wherein the light guide member is formed of polydimethylsiloxane (PDMS).

5. The method of claim 3, wherein the irradiating of the light further comprises:

irradiating the light to the photosensitive layer through the openings of the light blocking mask, the light being incident to the second surface of the template in a second direction inclined with respect to the second surface of the template, wherein the first direction and the second direction are symmetric with respect to the second surface.

* * * * *